July 28, 1942.  A. E. ARMSTRONG  2,291,131
TEMPERATURE CONTROL FOR DRIERS AND OTHER HEAT EXCHANGE ELEMENTS
Filed Aug. 19, 1940  2 Sheets-Sheet 1
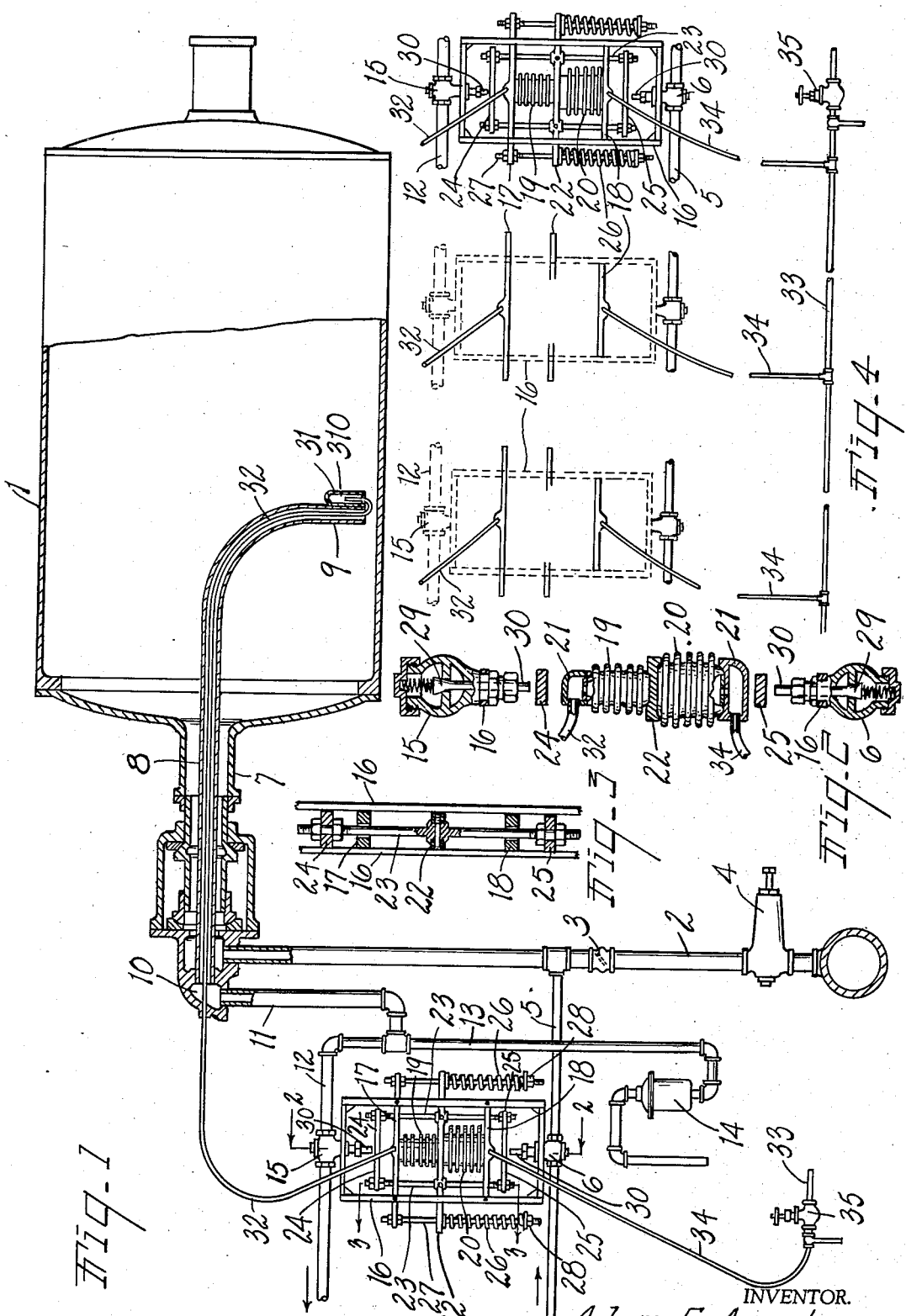
INVENTOR.
Adam E. Armstrong
BY Earl F. Chappell
ATTORNEYS

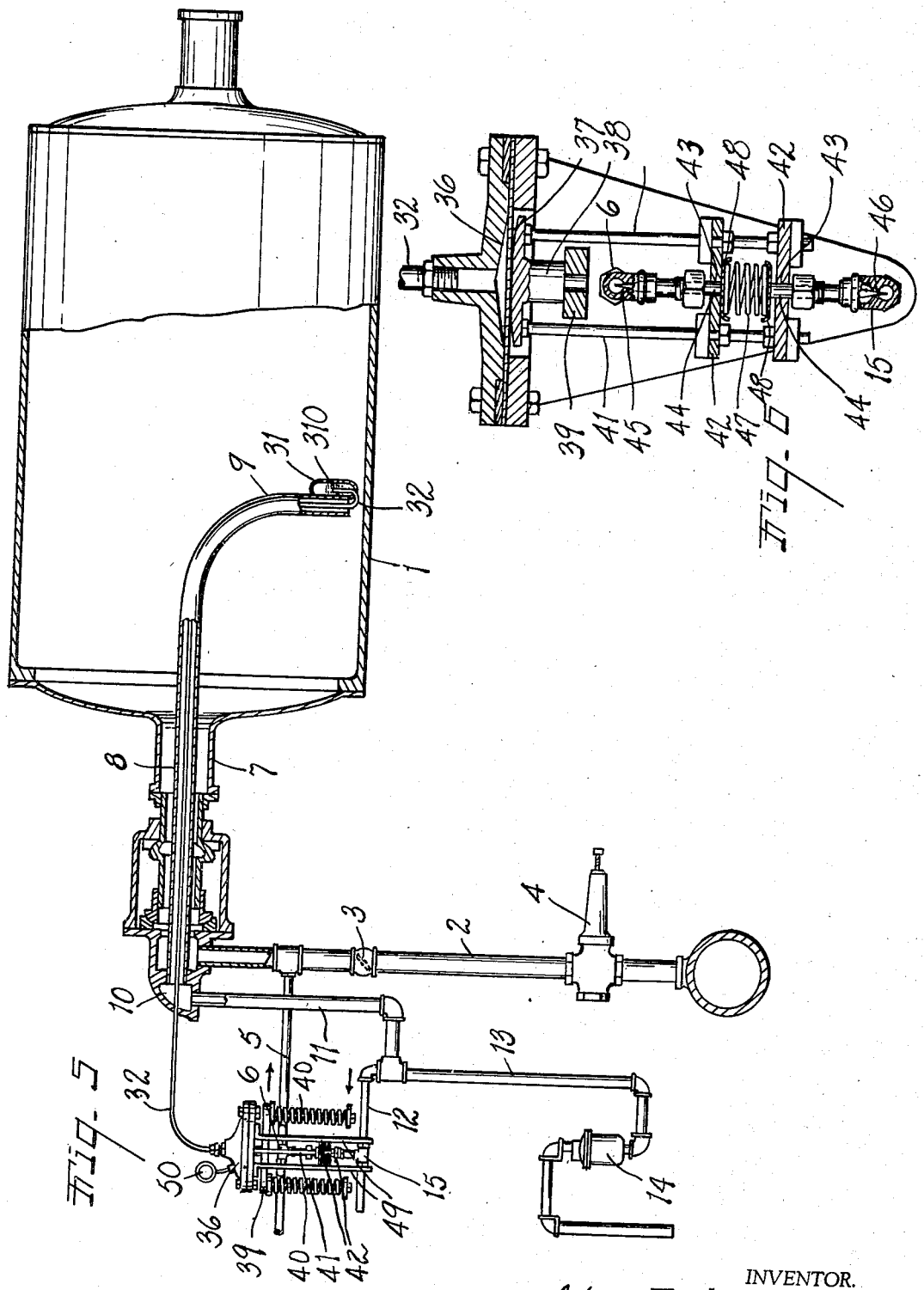

Patented July 28, 1942

2,291,131

UNITED STATES PATENT OFFICE 2,291,131

TEMPERATURE CONTROL FOR DRIERS AND OTHER HEAT EXCHANGE ELEMENTS

Adam E. Armstrong, Three Rivers, Mich., assignor to Armstrong Machine Works, Three Rivers, Mich., a corporation of Michigan Application August 19, 1940, Serial No. 353,270

24 Claims. (Cl. 34—48)

This invention relates to improvements in temperature controls for driers and other heat exchange elements.

The main objects of this invention are:

First, to provide a control for low temperature paper driers, cotton slashers, and the like, which is suitable for installation on individual driers to control and maintain the temperature thereof.

Second, to provide a control of the type described adapted to maintain a very uniform temperature in low pressure driers of the above stated type and in association with means for removing condensate therefrom.

Third, to provide a control of the type described adapted to accurately regulate the temperature of a drying cylinder adjacent the periphery thereof, the said control effecting its functions without error arising because of differences in temperature within the drier.

Fourth, to provide a control of the type described for a number of drying cylinders which are to be operated at different or graduated temperatures and including means for simultaneously adjusting the temperature of the cylinders while maintaining the graduated relation thereof.

Fifth, to provide a novel method of controlling a steam heated drying unit.

Objects relating to details and economies of the invention will appear from the description to follow. The invention is defined in the claims.

A structure embodying the features of my invention is illustrated in the accompanying drawings, wherein:

Fig. 1 is a view illustrating conventionally a drier element of a web drying machine, cotton slasher, or like heat exchanger, the same being shown partially in longitudinal section with elements of my improved control shown in operative relation thereto.

Fig. 2 is a somewhat enlarged view partially broken away and in section on line 2—2 of Fig. 1, illustrating details of construction of the control.

Fig. 3 is a fragmentary view in section on line 3—3 of Fig. 1.

Fig. 4 is a fragmentary view diagrammatically illustrating an embodiment of my invention wherein a plurality of controls are employed for maintaining the temperature of a plurality of heat exchangers in a predetermined relation, graduated if desired, and for varying the said temperatures when desired while maintaining said relation.

Fig. 5 is a view partially broken away and in longitudinal section illustrating a modified embodiment of control in accordance with my invention shown in operative relation to a drier element.

Fig. 6 is a somewhat enlarged view partially broken away and in vertical section illustrating details of construction of the control of Fig. 5.

In paper drying machines, it is desirable that the initial or wet end driers be held at low temperature and that the heat radiated from these driers be maintained approximately constant. If a condition of uniform heat radiation is maintained at the wet end of the machine, it will be apparent that the task of maintaining control of the drying conditions at the subsequent or dry end of the machine is facilitated. The device of this invention is accordingly intended to serve this purpose, although my invention has a wide range of uses and applications. In its preferred embodiment, I contemplate that a control device in accordance with the description to follow shall be supplied for each of the wet end driers of which there are usually only a few, so that the temperature of these driers may be individually set and continually maintained at the original setting thereof.

Referring to the drawings, the reference numeral 1 indicates the cylindrical drying element or cylinder of a paper drying machine, which in accordance with one contemplated adaptation of the invention is located at the wet end or web input end of the machine, although it will appear from the description to follow that the invention is not unduly restricted as to the location of the cylinder or shell to which it is applied in the drying machine or in its various applications and uses.

The reference numeral 2 designates a pipe supplying steam to the cylinder, in which pipe is inserted a non-return check valve 3. A suitable pressure regulator 4 is provided in the steam line for assuring a constant steam pressure.

In communication with the steam line on the down stream side of the check valve 3 is a tube or connection 5 for supplying air for mixture with steam entering the cylinder, the flow of air being controlled by a valve in the air connection which is generally designated 6. The air pressure is preferably slightly in excess of the steam pressure. The cylinder is provided with a hollow journal assembly conventionally illustrated and generally designated 7, through which the mixture of steam is admitted to its interior. Extending through this journal is an air and condensate discharge pipe 8 of the siphon type having a downturned end 9 terminating closely adjacent the periphery of the cylinder. This pipe discharges in a chamber 10 in the journal assembly and from there through a pipe 11 to an air and steam exhaust tube or connection 12 and a further pipe 13 leading to a steam trap 14 for discharging condensate. The air and steam discharge tube 12 is controlled by a valve which is generally designated 15, the air inlet valve 6 and the steam and air discharge valve 15 being automatically operated in accordance with the temperature adjacent the inner periphery of cylinder 1 in a manner to be described.

Disposed between and secured to the valves 6, 15 are a pair of rectangular frame members 16 which are secured as by screws to a pair of transverse bellows abutment members 17, 18, respectively, to which the open ends of the respective bellows 19, 20 are fixedly connected as by soldering. Each of the transverse abutment members 17, 18 includes a chamber 21 in communication with the bellows, as illustrated in Fig. 2. The closed ends of the respective bellows engage and transmit force to an actuated cross member or bar 22 which carries a pair of parallel rods 23 connecting together a pair of opposed cross heads 24, 25.

The bellows 20 is of somewhat greater capacity than the bellows 19 and acts in opposition thereto, being aided in this action by coil compression springs 26 which encircle depending guide members or rods 27 secured to lateral extensions on the upper transverse bellows abutment member 17. It will be understood that the nuts 28 which are threaded on the lowermost end of these guide rods 23 may be adjusted to vary the force exerted by the springs in the individual control devices for a purpose which will appear from the description to follow. The actuated member 22 slides freely on the guide rods 27 while the parallel rods 23 secured to the actuated member likewise slide freely relative to the transverse bellows abutment members 17, being received in holes formed therein for that purpose.

Each of the oppositely acting valves 15 includes a valve member 29 which is spring urged to closing position relative to a valve opening or seat, as illustrated in Fig. 2, and having a tappet stem portion 30 which is adapted to be engaged by one of the cross heads 24, 25 respectively upon vertical movement of the latter, to open the valves and permit flow of fluid to or from the drying element 1 as the case may be, in the direction of the arrows in Fig. 1.

A closed boiler or vessel 31 which is partially filled with a quantity of volatile liquid 310 such as acetone having a low boiling point is secured to the downturned end 9 of the siphon discharge 8 and a tube 32 leads from the interior of this vessel through the siphon discharge to the chamber 21 at the upper end of smaller bellows 19, so that the vapor pressure generated in the tube by the expansion of vapor generated from the volatile liquid is transmitted to the bellows 19 to actuate the same in opposition to the force of springs 26 and the lowermost and larger bellows 20. Such actuation causes the actuated member 22 to move vertically in either direction an amount proportional to the difference in temperature of the vapor in the boiler and the desired temperature at the periphery of drier 1, with resultant actuation of one or the other of the valve tappet portions 30 and opening of the corresponding valve 29 when this difference exceeds a predetermined number of degrees.

Dalton's law of partial pressures states that the total pressure exerted by a mixture of gases is equal to the sum of the separate pressures which each gas would exert if it alone occupied the whole volume filled by the mixture. When pure saturated steam exists within a chamber, the temperature of the steam definitely depends on its pressure, and the pressure being known, the temperature can be ascertained from any standard steam table. If, however, air is mixed with steam at a given pressure, its presence reduces the temperature of the mixture in proportion to the amount of air present. Therefore, if air is present in a drying cylinder along with water vapor, the temperature is that due only to the partial pressure of the vapor, while the total pressure is that due to the pressure of the vapor plus that due to the air present. Thus, for example, if the total pressure exerted against the walls of a vessel is 29.4 lbs. absolute and half this pressure is due to air and half due to saturated steam, the temperature of this mixture will correspond to the temperature of water vapor at 14.7 lbs. absolute, or 212° F. If the proportion of the air is increased, the temperature of the mixture will be lowered. If the medium exerting the total pressure of 29.4 lbs. absolute had been pure steam instead of a mixture of steam and air, the temperature would have been about 250° F. instead of 212° F. From the foregoing, it is evident that temperatures of a mixture of air and steam may be controlled by controlling the percentage of air present in the mixture.

In a drying cylinder drained through a siphon pipe, it is often necessary to carry temperatures to or below 212° F. Hence, if pure saturated steam is used in the drier, the pressure must be atmospheric or less to obtain temperatures at or below 212° F. This is often done, i. e., reduction of the pressure to atmospheric or below to reduce the temperature suitably; however, in order to effect drainage of condensate from the drier, a vacuum pump must be used and it follows that the lowest practical temperature attainable depends on the maximum vacuum which is economical to carry by means of a pump or condenser and pump. The installation and operation of such a system is expensive, both from the standpoint of first cost and maintenance and in actual practice it is difficult to accurately maintain low temperatures within a drying cylinder under vacuum, due to the fact that the high vacuum necessary for drainage pulls air into the cylinder through the steam joints and dilutes the steam by an uncontrollable amount, with resulting unpredictable variations in temperature.

Accordingly, in order to provide a means for accurately maintaining low temperatures in drying cylinders (or in any heat transfer equipment using steam as the heating medium) and at the same time provide means for accurately adjusting and controlling such temperatures, I have produced the above described device and a brief description will make evident its manner of functioning to these ends.

Assuming that it is desired to maintain a temperature of 150° F. within the drier 1, it is readily ascertainable that the pure steam pressure corresponding to this temperature is 3.714 lbs. absolute, which corresponds to a vacuum of 22.35 inches of mercury. However, in order to cause condensate to flow out of the drier through siphon pipe 8, sufficient pressure must be carried in the drier to lift the condensate up over the siphon and for sake of illustration it may be assumed that this pressure is 3 lbs. gauge or 17.7 lbs. absolute. In order to assure that steam will flow from the supply header through pipe 2 to the drier, the steam supply pressure is maintained constant by regulator 4 at 3 lbs. gauge. If the drier has just been started after a period of inactivity during which time it has filled with air through leaks around the steam joint and by back flow through trap 14, the temperature of the interior of the drier corresponds to atmospheric temperature. As steam is turned into the drier, the temperature rises and heat is transferred through the walls of boiler 31, which heat raises the temperature of the volatile liquid within the boiler and sets up pressure therein. The volatile liquid, i. e., acetone, has a characteristic pressure-temperature curve so that for any given temperature there will always be a corresponding fixed pressure, and conversely. The pressure within the boiler is transferred through small tube 32 to bellows 19, setting up a corresponding force against actuated member 22. The control device will be adjusted whereby the force exerted by springs 26 plus that exerted by bellows 20 just balances the force exerted by bellows 19 when the drier reaches 150° F. When these forces balance, actuated member 22 is in neutral position and both valves 29 are spring pressed to closing position so that no air is admitted through the tube 5 and no steam-air mixture exhausted through tube 12. Under the foregoing conditions, the total pressure within the drier will be 3 lbs. gauge or 17.7 lbs. absolute and of this 3.714 lbs. absolute will be due to steam while 13.986 lbs. will be due to air.

Now assume that the temperature within the drier 1 rises about 150° F. This means that the partial pressure due to the steam has become a greater percentage of the total pressure and as a result the vapor pressure exerted by the volatile liquid in the boiler 31 increases to overbalance the combined opposing forces in springs 26 and bellows 20. When, as a result of this overbalancing, the cross head 25 engages the lowermost valve tappet 30 and unseats the corresponding valve, compressed air will be admitted through tube or line 5 to drier 1, thereby increasing the partial pressure in the drier due to air and decreasing that due to steam. As a result, the temperature within the drier will be reduced and will continue to fall until 150° F. is again reached, at which time the forces due to springs and bellows will again be in equilibrium and the actuated member 22 will return to neutral position with both valves 6, 15 shut off. If the temperature in the drier falls below 120° F., the operation is reversed, i. e., the vapor pressure in the boiler 31 is lowered, with corresponding reduction in the force exerted by bellows 19 and valve 15 is opened to exhaust steam and air mixture. The air pressure lost by such venting is replaced by steam from pipe 2, with the resulting temperature raise and restoration of equilibrium.

In considering the above operation, it should be kept in mind that the total drier pressure remains constant and that partial pressures due to air and steam are varied to control drier temperature. I have found in actual installation of the foregoing system that the temperatures within the drier 1 may be controlled to very close limits of variation and that any temperature can be maintained, from that corresponding to extremely low to the temperature corresponding to the maximum steam pressure available.

It will be apparent to those skilled in the art that the entire force opposing bellows 19 could be supplied by suitable springs 26, however I have provided the bellows 20 in order to enable a remote control of a number of drying cylinders, such remote control enabling the temperatures in all the driers to be simultaneously adjusted while at the same time maintaining any desired difference or gradation in the temperatures of the various individual driers. This obviously greatly facilitates the adjustment of the driers for different jobs. Were some such provision not present, it would be necessary to individually adjust the nuts 28 controlling the compression of springs 26 for each of the driers, a tedious, inaccurate, and time consuming operation.

The mechanism for performing the aforesaid simultaneous adjustment consists of a source of fluid pressure which may be air, water, oil, or any other suitable medium, the said medium being supplied to a header 33 connected by branch tubes 34 with the corresponding control chambers 21 provided on each of the lowermost bellows abutment members 18. A supply of the medium is controlled by a suitable valve 35 and it will be apparent that by admitting more of the air or other medium to the bellows 20, it is possible to regulate the force exerted thereby in opposition to the bellows 19.

I find the use of a boiler 31 and a volatile liquid whose vapor pressure is effective on bellows 19 to be of particular value in the interests of accuracy of operation of the control of my invention. Thus, I have observed that the air and steam mixture within the cylinder tends to stratify in temperature, being cooler immediately adjacent the cylinder periphery where the work is done and hotter adjacent the center of the cylinder. Of course, it is the temperature immediately adjacent the periphery of the cylinder which is critical in the control thereof. However, were the steam and air mixture itself employed to effect the regulation of the percentage of steam and air in the drier, error would inevitably creep in due to the fact that in rising through the downturned end 9 of the siphon discharge 8 the mixture would be heated above its temperature immediately adjacent the drum, with the result that the mixture effective on the control device would not be at a pressure corresponding to its true temperature adjacent the drier periphery. Consequently, the resultant adjustment or regulation would be inadequate. To overcome this and provide assurance that at all times the pressure effective on bellows 19 will accurately reflect the temperature condition immediately adjacent the periphery of drier 1, I employ the boiler 31 and connections which have been described above and I find that it performs faithfully in response to changes in that temperature.

In Figs. 5 and 6, I illustrate a modified embodiment of my invention. This consists of a diaphragm chamber 36 with which tube 32 communicates, the pressure transmitted therethrough being effective on a diaphragm 37. This diaphragm acts directly on a plunger 38 which is secured to a cross head 39 urged upwardly by coil springs 40 in opposition to the fluid force exerted on the diaphragm. Plunger 28 carries a pair of depending rods 41 to which are secured a pair of spaced parallel cross bars 42 each having a central aperture 43 for receiving one of the alined oppositely acting vertically reciprocable valve stems 44. These stems are connected respectively to needle valves 45, 46 controlling the valves 15 and 6, respectively, and thereby governing the inflow of air through connection 5 and the exhaust of steam through tube 12. The said valve stems 44 are yieldably connected by a coil spring 47 abutting cupped sheet metal thrust members 48 attached to the respective stems. It will be noted that the vertical spacing of cross bars 42 is greater than the normal distance between the thrust members 48 when the spring 47 is in relaxed position.

The diaphragm housing or chamber 36 is fixedly supported by suitable frame members 49 and if desired the pressure therein may be readily ascertained from a suitable gauge 50 whereby it is possible to ascertain the temperature of the volatile liquid in boiler 31 and thus the temperature in the drier adjacent its periphery. If desired, this device may be directly calibrated in terms of temperature.

The operation of the foregoing device is generally similar to that illustrated in Figs. 1-4. When the temperature in drier 1 is at the desired point, the cross bars 42 are in a neutral position and the needle valves 45, 46 are resiliently seated and close their respective connections 15, 6. A drop in the temperature of the drier results in a decrease in pressure on diaphragm 37 whereby springs 40 lift cross bars 42 and raise the lowermost needle valve to open the air and steam exhaust tube 12 while increase in temperature above the desired point causes an opposite operation, i. e., opening of the air inlet connection 5.

The aforesaid system is one which is extremely accurate in its operation to maintain at all times a balance of steam and air in the drum sufficient to preserve the desired temperature without the need for expensive vacuum pumps or other apparatus and without errors due to stratification as discussed above. It is well adapted for the control of a number of drier units at graduated temperatures and it has a wide adaptation to paper web drier controls, slasher machines, and other common types of drying instrumentalities as well as to other types of heat exchange units.

I have illustrated and described my improvements in embodiments which are very practical. I have not attempted to illustrate or describe other embodiments or adaptations as it is believed this disclosure will enable those skilled in the art to embody or adapt my improvements as may be desired.

Having thus described my invention, what I claim as new and desire to secure by Letters Patent is:

1. A temperature control for a cylindrical rotating heat exchange member, comprising means for supplying steam to said member at constant pressure, a connection for supplying air to the cylinder at a pressure slightly in excess of the pressure of the steam supplied thereto, means for exhausting condensation and a relatively cool mixture of air and steam from a point within the member adjacent the periphery thereof, comprising an exhaust connection and a siphon tube in communication therewith and extending axially of the member, said tube having an offset and terminating closely adjacent said periphery whereby to remove the mixture under the influence of the pressure in the cylinder, means to control the exhaust from the drier member when its temperature adjacent the periphery drops below a predetermined point and for admitting air to the drier member when said temperature rises above a predetermined point, comprising alined oppositely acting valves controlling said air supply and said steam and air exhaust connections, a diaphragm housing, a diaphragm therein, a boiler element associated with said siphon tube in said drier member adjacent the periphery of the latter, said boiler element containing a thermally responsive fluid having a relatively low boiling point, means for communicating said boiler with said diaphragm housing to one side of the diaphragm whereby changes in the temperature of the boiler produce proportionate changes in the pressure on the diaphragm, and means for connecting said diaphragm with said valves for actuation thereof in response to movement of the diaphragm, said means including a flexible connection for the valves, and a spring acting on said diaphragm in opposition to the vapor pressure thereon, said valves opening the air supply connection and closing the air-steam connection and vice versa, upon movement of the diaphragm in opposite directions, said flexible connection urging both valves to closing position in neutral position of the diaphragm.

2. A temperature control for a heat exchange member, comprising means for supplying steam to said member, a connection for supplying air to the member, means for exhausting condensation and a relatively cool mixture of air and steam from a point within the member adjacent the radiating surface thereof, comprising an exhaust connection and a siphon tube in communication therewith, said tube having an offset end terminating closely adjacent the radiating surface whereby to remove the mixture under the influence of the pressure in the member, and means to control the exhaust from the heat exchange member when its temperature adjacent the radiating surface drops below a predetermined point and for admitting air to the heat exchange member when said temperature rises above a predetermined point, comprising valves controlling said air supply and said steam and air exhaust connections, a diaphragm housing, a diaphragm therein, a boiler element associated with said siphon tube in said member adjacent the surface of the latter, said boiler element containing a thermally expansive fluid having a relatively low boiling point, means for communicating said boiler with said diaphragm housing to one side of the diaphragm whereby changes in the temperature of the boiler produce proportionate changes in the pressure on the diaphragm, and means for connecting said diaphragm with said valves for actuation thereof in response to movement of the diaphragm, said valves opening the air supply connection and closing the air-stream exhaust connection and vice versa upon movement of the diaphragm in opposite directions.

3. In a temperature regulator for a heat exchange unit, means for supplying heating steam to said unit, an air supply connection to mix air with steam supplied to the unit and a connection for exhausting relatively cool steam and air from the unit, comprising a siphon discharge extending immediately adjacent the radiating surface of the unit, valve means for said connections for simultaneously opening one thereof and closing the other and vice versa, and means for actuating said valve means in response to variations in temperature immediately adjacent said surface, comprising a pressure responsive member, and means for applying pressure on said member proportional to the temperature in said unit adjacent its surface, comprising a boiler element disposed in said unit adjacent the surface and containing a fluid having a boiling point lower than the normal temperature adjacent said surface and a tube for communicating fluid in said boiler element with said pressure responsive member to act on the latter whereby the pressure exerted thereon is directly proportional to the temperature of said boiler, and means for actuating said valve means from said pressure responsive member, whereby upon movement thereof in either direction from a neutral point one of the connections is opened and the other closed, both thereof being closed by the valve means in said neutral position.

4. In a temperature regulator for a heat exchange unit, means for supplying heating steam to said unit, an air supply connection to mix air with steam supplied to the unit and a connection for exhausting relatively cool steam and air from the unit, comprising a siphon discharge extending therein, valve means for said connections for simultaneously opening one thereof and closing the other and vice versa, and means for actuating said valve means in response to variations in temperature in the unit, comprising a pressure responsive member, and means for applying pressure to said last named member proportional to the temperature in said heat exchange unit, comprising a boiler element disposed in the unit and containing a liquid having a relatively low boiling point and a tube for communicating vapor pressure in said boiler element with said pressure responsive member whereby the pressure exerted thereon is proportional to the temperature of said boiler, and means for actuating said valve means from said pressure responsive member whereby upon movement of the latter in either direction one of the connections is opened and the other closed.

5. A temperature control for a low pressure heating member to maintain the temperature adjacent a heating surface thereof at a predetermined point, comprising means for supplying steam to said member, a connection for supplying air thereto and a further connection for exhausting steam and air therefrom, said connections having valves therein, and means for actuating said valves to admit air to the member from said first named connection when the temperature adjacent said surface rises above a predetermined point and to exhaust steam and air through said second named connection when the temperature drops below a predetermined point, said steam supply means providing steam to take its place, comprising a pressure responsive member for controlling the movement of said valves, and thermally responsive means disposed in said heating member adjacent the heating surface thereof, and communicating with said pressure responsive member to exert a pressure thereon proportional to the temperature adjacent said heating surface.

6. A temperature control for a low pressure heating member to maintain the temperature adjacent a heating surface thereof at a predetermined point, comprising means for supplying steam to said member, a connection for supplying air thereto and a further connection for exhausting steam and air therefrom, valve means controlling said connections, and means for actuating said valve means to admit air to the member from said first named connection when the temperature adjacent said surface rises above a predetermined point and to exhaust steam and air through said second named connection when the temperature drops below a predetermined point, said steam supply means providing steam to take its place, comprising a pressure responsive member connected to and controlling said valve means, and thermally responsive pressure generating means disposed in said heating member adjacent the heating surface thereof, and communicating with said pressure responsive member including a connection for transmitting pressure from said thermally responsive means to said pressure responsive member to exert a pressure thereon proportional to the temperature adjacent said heating surface.

7. A temperature control for a heating member to maintain the temperature thereof at a predetermined point, comprising means for supplying steam to said member, a connection for supplying air thereto and a further connection for exhausting steam and air therefrom, valve means controlling said connections, and means for actuating said valve means to admit air to the member from said first named connection when the temperature in said member rises above a predetermined point and to exhaust steam and air through said second named connection when the temperature drops below a predetermined point, said steam supply means providing steam to take its place, comprising a pressure responsive member controlling said valve means, and thermally responsive means disposed in said heating member, and communicating with said pressure responsive member and influenced by the temperature of said heating member to exert a pressure thereon proportional to the temperature of the heating member.

8. In an apparatus of the class described, the combination of a drier cylinder, a connection provided with a return check valve for supplying steam to said cylinder at a predetermined pressure, a siphon tube exhaust connection for said cylinder, a steam trap to which said exhaust connection delivers, an air exhaust valve for said exhaust connection disposed in advance of said trap, an air supply connection delivering to said steam supply connection at the rear of its said check valve, an air inlet valve for said air inlet connection, an operating connection for said air inlet and said exhaust valve including spring means acting to normally close both valves, a control means for said valves comprising a pressure chamber, a boiler element disposed in said cylinder adjacent the periphery thereof, said boiler element being connected to said pressure chamber by a tube arranged through said siphon tube, a pressure actuated member operatively associated with said pressure chamber and with said valves for opening the air inlet valve when the pressure exceeds a predetermined point, and spring means acting in opposition to said pressure actuated member for closing the air valve and opening the exhaust valve when the pressure in said pressure chamber falls below a predetermined point.

9. A temperature control for a steam drier having a source of steam communicating therewith, comprising means for supplying air to said drier for mixture with steam supplied thereto, means for exhausting steam and air from said drier, valve means controlling said air supply and exhausting means respectively, and means for actuating said valves to admit air to said drier when the temperature therein rises above a predetermined desired point and for exhausting steam and air from the drier when the temperature thereof falls below a predetermined point, whereby steam from said steam supply means raises the temperature, comprising a vessel disposed in said drier adjacent the periphery thereof, said vessel containing a volatile liquid adapted to generate vapor pressure when heated, a pressure responsive element, means for actuating said valve means from said pressure responsive element, and means connecting said pressure responsive element with said vessel whereby said vapor pressure is effective on said element to actuate the same.

10. A control for steam heated driers and the like having steam supply means connected thereto, said control including means for draining condensate from the drier, means for supplying air to the interior of the drier, means for exhausting air and steam from the interior of the drier, valve means for controlling said air supply and exhaust means, means for actuating said valve means in accordance with the temperature within the drier, comprising a thermally responsive element in the drier having a volatile liquid therein adapted to generate vapor pressure in accordance with the variations in temperature of the drier, a flexible bellows communicating with said element and subject to said vapor pressure, means connected to and actuated by said bellows for actuating said valve means, and resilient means for opposing movement of said bellows in one direction including a further pressure responsive element opposing said bellows, and means for varying the force exerted by said last named pressure responsive element.

11. A control for steam heated driers and the like having steam supply means connected thereto, said control including means for draining condensate from the drier, means for supplying air to the interior of the drier, means for exhausting air and steam from the interior of the drier, valve means for controlling said air supply and exhaust means, means for actuating said valve means in accordance with the temperature within the drier, comprising a thermally responsive element in the drier having a volatile liquid therein adapted to generate vapor pressure in accordance with the variations in temperature of the drier, a flexible bellows communicating with said element and subject to said vapor pressure, and means connected to and actuated by said bellows for actuating said valve means.

12. In an apparatus of the class described, the combination of a drier cylinder, a connection for supplying steam to said cylinder at predetermined pressure, a siphon exhaust tube connected to said cylinder, an air exhaust valve for said exhaust tube, an air supply pipe connected to said cylinder, an air inlet valve for said air supply pipe, an operating connection in said air inlet and said exhaust valves including a spring means acting to normally close both valves, a control means for said valves comprising a pressure chamber, a boiler element disposed in said cylinder adjacent the periphery thereof, said boiler element being connected to said pressure chamber by a tube arranged through said siphon exhaust tube, a pressure actuated member operatively associated with said pressure chamber and with said valves for opening the air inlet valve when the pressure within said boiler element exceeds a predetermined point, and spring means acting in opposition to said pressure actuated member for closing the air valve and opening the exhaust valve when the pressure in said pressure chamber falls below a predetermined point.

13. In an apparatus of the class described, the combination with a heat exchange element having a radiating wall, of a connection provided with a return check valve for supplying steam to said element at predetermined pressure, a siphon exhaust tube connected to said element, a steam trap to which said exhaust tube delivers, an air exhaust valve in said exhaust tube disposed in advance of said trap, an air supply pipe connected to and delivering to said steam supply connection at the rear of its said check valve and having an air inlet valve therein, an operating connection for said air inlet and said exhaust valves including a spring means acting to normally close both valves, a control means for said valves comprising a pressure chamber, a boiler element disposed in said heat exchange element adjacent the radiating wall thereof, said boiler element being connected to said pressure chamber by a tube arranged through said siphon exhaust tube, a pressure actuated member operatively associated with said pressure chamber and said valves for opening the air inlet valve when the pressure within said boiler element exceeds a predetermined point, and spring means acting in opposition to said pressure actuated member for closing the air valve and opening the exhaust valve when the pressure in the pressure chamber falls below a predetermined point.

14. In an apparatus of the class described, the combination with a heat exchange element having a radiating wall, of a connection for supplying steam to said element at predetermined pressure, an exhaust tube connected to said element, an air exhaust valve in said exhaust tube, an air supply pipe connected to said element having an air inlet valve therein, an operating connection for said air inlet and said exhaust valves including a spring means acting to normally close both valves, a control means for said valves comprising a pressure chamber, a boiler element disposed in said heat exchange element adjacent the radiating wall thereof, said boiler element being connected to said pressure chamber by a tube arranged through said exhaust tube, a pressure actuated member operatively associated with said pressure chamber and said valves for opening the air inlet valve when the pressure within said boiler element exceeds a predetermined point, and spring means acting in opposition to said pressure actuated member for closing the air valve and opening the exhaust valve when the pressure in the pressure chamber falls below a predetermined point.

15. In an apparatus of the class described, the combination with a heat exchange element having a radiating wall, of a connection provided with a return check valve for supplying steam to said element at predetermined pressure, a siphon exhaust tube connected to said element, a steam trap to which said exhaust tube delivers, an air exhaust valve in said exhaust tube disposed in advance of said trap, an air supply pipe connected to said steam supply connection at the rear of its said check valve, an air inlet valve in said air supply pipe, a control means for said valves including a pressure actuated element, and a boiler element disposed in said heat exchange element adjacent the radiating wall thereof and operatively associated with said pressure actuated element, a shiftable member operatively associated with said pressure actuated element and said valves for opening the air inlet valve when the boiler pressure on said last named element exceeds a predetermined point, and spring means acting on said shiftable member for closing the air valve and opening the exhaust valve when the boiler pressure on the pressure actuated element falls below a predetermined point.

16. In an apparatus of the class described, the combination with a heat exchange element having a radiating wall, of a connection for supplying steam to said element at predetermined pressure, an exhaust tube connected to said element, a steam trap to which said exhaust tube delivers, an air exhaust valve in said exhaust tube, an air supply pipe connected to said heat exchange element, an air inlet valve in said air supply pipe, a control means for said valves including a pressure actuated element, and a boiler element disposed in said heat exchange element adjacent the radiating wall thereof and operatively associated with said pressure actuated element, a shiftable member operatively associated with said pressure actuated element and said valves for opening the air inlet valve when the boiler pressure on said last named element exceeds a predetermined point, and spring means acting on said shiftable member for closing the air valve and opening the exhaust valve when the boiler pressure on the pressure actuated element falls below a predetermined point.

17. A control for steam heated driers and the like having steam supply means connected thereto, said control including means for draining condensate from the drier, means for supplying air to the interior of the drier, means for exhausting air and steam from the interior of the drier, valve means for controlling said air supply and exhaust means, means for actuating said valve means in accordance with the temperature within the drier, comprising a thermally responsive element in the drier having a volatile liquid therein adapted to generate vapor pressure in accordance with the variations in temperature of the drier, pressure responsive means communicating with said element and subject to said vapor pressure, means connected to and actuated by said pressure responsive means for actuating said valve means, and resilient means for opposing movement of said pressure responsive means in one direction including a further pressure responsive element opposing said first named pressure responsive element, and means for varying the force exerted by said last named pressure responsive element.

18. A control for steam heated driers and the like having steam supply means connected thereto, said control including means for draining condensate from the drier, means for supplying air to the interior of the drier, means for exhausting air and steam from the interior of the drier, valve means for controlling said air supply and exhaust means, means for actuating said valve means in accordance with the temperature within the drier, comprising a thermally responsive element in the drier having a volatile liquid therein adapted to generate vapor pressure in accordance with the variations in temperature of the drier, pressure responsive means communicating with said element and subject to said vapor pressure, and means connected to and actuated by said pressure responsive means for actuating said valve means.

19. A control for a drying system including a plurality of driers arranged in series and having means for supplying heating medium thereto, said control comprising a plurality of temperature responsive elements containing a volatile liquid, a plurality of pressure responsive elements connected to and subject to vapor pressure arising in said first named elements due to variations in temperature of the driers, there being a pressure responsive and a thermally responsive element for each of said driers, the latter being located internally of the driers, means connected to said driers for supplying and exhausting heating medium therefor including intake and exhaust valves, means controlled by said pressure responsive elements for actuating said valves, and resilient means acting in opposition to said pressure responsive elements, comprising a plurality of bellows one for each of said driers, each of said bellows acting in opposition to the force exerted by said first named pressure responsive elements, and means for simultaneously regulating the force exerted by said bellows, comprising a source of fluid control medium and means for communicating said bellows with said last named source to expand or contract the bellows and thereby regulate their resistance to said first named pressure responsive elements.

20. The combination with a plurality of heat exchange units, of a common heating fluid supply for said units, a temperature responsive element containing a volatile liquid operatively associated internally of each unit, a pressure responsive bellows connected with each of said temperature responsive elements, means connected to said unit for supplying and exhausting heating medium therefor, including intake and exhaust valves, means controlled by said bellows for actuating said valves, separately adjustable spring thrust means for said bellows, a bellows acting in thrusting opposition to each of said first named bellows, a common source of fluid control medium for said second bellows, and means for controlling said fluid medium.

21. The combination with a plurality of heat exchange units, of a common heating fluid supply for said units, a temperature responsive element containing a volatile liquid operatively associated internally of each unit, a pressure responsive bellows connected with each of said temperature responsive elements, means connected to said units for supplying and exhausting heating medium therefor, including intake and exhaust valves, means controlled by said pressure responsive elements for actuating said valves, a bellows acting in thrusting opposition to each of said first named bellows, a common source of fluid control medium for said second bellows, and means for controlling said fluid medium.

22. The combination with a plurality of heat exchange units, of a common heating fluid supply for said units, a temperature responsive element containing a volatile liquid operatively associated internally of each unit, a pressure responsive element connected to each of said temperature responsive elements and subject to variations in pressure therein resulting from variations in temperature of the heat exchange unit with which its temperature responsive element is associated, means connected to said units for supplying and exhausting heating medium therefor, including intake and exhaust valves, means controlled by said pressure responsive elements for actuating said valves, separately adjustable spring thrust means for said pressure responsive elements, a bellows acting in thrusting opposition to each of said pressure responsive elements, a common source of fluid control medium for said bellows, and means for controlling said fluid medium.

23. The combination with a plurality of heat exchange units, of a common heating fluid supply for said units, a temperature responsive element containing a volatile liquid operatively associated internally of each unit, a pressure responsive element connected to each of said temperature responsive elements and subject to variations in pressure therein resulting from variations in temperature of the heat exchange unit with which its temperature responsive element is associated, means connected to said units for supplying and exhausting heating medium therefor, including intake and exhaust valves, means controlled by said pressure responsive elements for actuating said valves, a bellows acting in thrusting opposition to each of said pressure responsive elements, a common source of fluid control medium for said bellows, and means for controlling said fluid medium.

24. The combination with a plurality of heat exchange units, of a common heating fluid supply for said units, a temperature responsive element containing a volatile liquid operatively associated internally of each unit, a pressure responsive element connected to each of said temperature responsive elements and subject to variations in pressure therein resulting from variations in temperature of the heat exchange unit with which its temperature responsive element is associated, means connected to said units for supplying and exhausting heating medium therefor, including intake and exhaust valves, means controlled by said pressure responsive elements for actuating said valves, separately adjustable spring thrust means for said pressure responsive elements, a pneumatic thrust means in thrusting opposition to each of said pressure responsive elements, a common source of fluid control medium for said pneumatic thrust means, and means for controlling said fluid medium.

ADAM E. ARMSTRONG.